US012387212B2

(12) United States Patent
Botros et al.

(10) Patent No.: US 12,387,212 B2
(45) Date of Patent: Aug. 12, 2025

(54) CONFIGURING VERIFICATION INFORMATION AT POINT-OF-SALE DEVICES

(71) Applicant: Block, Inc., San Francisco, CA (US)

(72) Inventors: Paul Abraham Botros, Berkeley, CA (US); Kate Fitch, San Francisco, CA (US)

(73) Assignee: Block, Inc., Oakland, CA (US)

( * ) Notice: Subject to any disclaimer, the term of this patent is extended or adjusted under 35 U.S.C. 154(b) by 1449 days.

(21) Appl. No.: 16/799,344

(22) Filed: Feb. 24, 2020

(65) Prior Publication Data

US 2020/0250673 A1 Aug. 6, 2020

Related U.S. Application Data

(63) Continuation of application No. 15/464,079, filed on Mar. 20, 2017, now abandoned.

(51) Int. Cl.
*G06Q 20/40* (2012.01)
*G06Q 20/20* (2012.01)
(Continued)

(52) U.S. Cl.
CPC ......... *G06Q 20/4012* (2013.01); *G06Q 20/20* (2013.01); *G06Q 20/202* (2013.01);
(Continued)

(58) Field of Classification Search
None
See application file for complete search history.

(56) References Cited

U.S. PATENT DOCUMENTS 3,863,050 A 1/1975 Brugger et al.
4,048,476 A 9/1977 Lawter et al.
(Continued)

FOREIGN PATENT DOCUMENTS

EP 2 579 194 A1 4/2013
WO 2013/147904 A1 10/2013
(Continued)

OTHER PUBLICATIONS

Ruiter, Joeri de, "Lessons learned in the analysis of the EMV and TLS security protocols", IPA dissertation series: Nov. 2015 (Year: 2015).*

(Continued)

*Primary Examiner* — Clay C Lee
(74) *Attorney, Agent, or Firm* — Lee & Hayes, P.C.

(57) ABSTRACT

Storing, in a database associated with an issuer, an association between a device identifier of a device of a user and a card identifier of a physical payment card of the user; receiving, by the issuer from a point-of-sale (POS) device via a card network, a request to authorize use of the payment card, the request including the card network and card identifier and generated responsive to interaction between the POS device and the payment card; determining, utilizing the card identifier, that an issuer application has been installed on the device; determining, based on the application being installed and the type of the payment card, a cardholder verification method (CVM) for verifying the payment card, wherein the CVM differs from a default CVM for the card network; and based on determining the CVM, sending, to the POS device, a request for input according to the CVM.

20 Claims, 6 Drawing Sheets

(51) Int. Cl.
  *G06Q 20/32* (2012.01)
  *G06Q 20/34* (2012.01)
(52) U.S. Cl.
  CPC ....... *G06Q 20/3224* (2013.01); *G06Q 20/356* (2013.01); *G06Q 20/4015* (2020.05); *G06Q 20/4016* (2013.01); *G06Q 20/4018* (2013.01); *G06Q 20/405* (2013.01); *G06Q 20/409* (2013.01)

(56) References Cited

U.S. PATENT DOCUMENTS

| | | | |
|---|---|---|---|
| 5,859,414 | A | 1/1999 | Grimes et al. |
| 6,311,165 | B1 | 10/2001 | Coutts et al. |
| 6,330,546 | B1 | 12/2001 | Gopinathan et al. |
| 7,376,618 | B1 | 5/2008 | Anderson et al. |
| 7,702,553 | B1 | 4/2010 | Dickelman |
| 7,783,515 | B1 | 8/2010 | Kumar et al. |
| 7,788,195 | B1 | 8/2010 | Subramanian et al. |
| 8,397,988 | B1 | 3/2013 | Zuili |
| 8,498,900 | B1 | 7/2013 | Spirin et al. |
| 8,606,696 | B1 | 12/2013 | Halpern |
| 8,745,698 | B1 | 6/2014 | Ashfield et al. |
| 8,762,272 | B1 | 6/2014 | Cozens et al. |
| 8,856,894 | B1 | 10/2014 | Dean et al. |
| 8,990,121 | B1 | 3/2015 | Guise et al. |
| 9,125,180 | B1 | 9/2015 | Hamilton et al. |
| 9,165,296 | B2 | 10/2015 | Gannon |
| 9,166,999 | B1 | 10/2015 | Kulkarni et al. |
| 9,286,500 | B1 | 3/2016 | Post et al. |
| 9,373,112 | B1 | 6/2016 | Henderson et al. |
| 9,396,730 | B2 | 7/2016 | Karpey et al. |
| 9,436,335 | B1 | 9/2016 | Scherer et al. |
| 9,530,128 | B1 | 12/2016 | Bekmann et al. |
| 9,633,322 | B1 | 4/2017 | Burger |
| 9,767,471 | B1 | 9/2017 | Perrone et al. |
| 9,818,093 | B1 | 11/2017 | Grier |
| 9,836,732 | B1 | 12/2017 | Mocko et al. |
| 9,852,410 | B1* | 12/2017 | Chen ................ G06Q 20/4012 |
| 9,996,829 | B1 | 6/2018 | Baig et al. |
| 10,049,349 | B1 | 8/2018 | Grassadonia et al. |
| 10,062,078 | B1 | 8/2018 | Boates et al. |
| 10,068,235 | B1 | 9/2018 | Boates et al. |
| 10,163,107 | B1 | 12/2018 | White et al. |
| 10,185,958 | B2 | 1/2019 | Henderson et al. |
| 10,339,525 | B2 | 7/2019 | Bogaard |
| 10,366,378 | B1 | 7/2019 | Han et al. |
| 10,460,317 | B2 | 10/2019 | Chitilian et al. |
| 10,515,354 | B1 | 12/2019 | Ishaq |
| 2002/0099649 | A1 | 7/2002 | Lee et al. |
| 2002/0133409 | A1 | 9/2002 | Sawano et al. |
| 2004/0034612 | A1 | 2/2004 | Mathewson et al. |
| 2004/0148252 | A1 | 7/2004 | Fleishman |
| 2005/0071232 | A1 | 3/2005 | Frater |
| 2006/0000900 | A1 | 1/2006 | Fernandes et al. |
| 2006/0151598 | A1 | 7/2006 | Chen et al. |
| 2006/0224507 | A1 | 10/2006 | Torpin et al. |
| 2006/0240890 | A1 | 10/2006 | Walker et al. |
| 2006/0249574 | A1 | 11/2006 | Brown et al. |
| 2006/0255128 | A1 | 11/2006 | Johnson et al. |
| 2007/0106609 | A1 | 5/2007 | Phillips et al. |
| 2007/0108279 | A1 | 5/2007 | Wang |
| 2007/0226095 | A1 | 9/2007 | Petriuc |
| 2008/0005037 | A1 | 1/2008 | Hammad et al. |
| 2008/0208743 | A1 | 8/2008 | Arthur et al. |
| 2008/0238610 | A1 | 10/2008 | Rosenberg |
| 2008/0319869 | A1 | 12/2008 | Carlson et al. |
| 2009/0006151 | A1 | 1/2009 | Zarghami et al. |
| 2009/0048936 | A1 | 2/2009 | Lerch et al. |
| 2009/0055276 | A1 | 2/2009 | Dunsmore et al. |
| 2009/0164374 | A1 | 6/2009 | Shastry |
| 2010/0005013 | A1 | 1/2010 | Uriarte |
| 2010/0023204 | A1 | 1/2010 | Basir et al. |
| 2010/0057612 | A1 | 3/2010 | Wagenhals |
| 2010/0063945 | A1 | 3/2010 | Cowan, Jr. |
| 2010/0097946 | A1 | 4/2010 | Celentano et al. |
| 2010/0114776 | A1 | 5/2010 | Weller et al. |
| 2010/0299195 | A1 | 11/2010 | Nix et al. |
| 2010/0305993 | A1 | 12/2010 | Fisher |
| 2011/0047075 | A1 | 2/2011 | Fourez |
| 2011/0131122 | A1 | 6/2011 | Griffin et al. |
| 2011/0131130 | A1 | 6/2011 | Griffin et al. |
| 2011/0254655 | A1 | 10/2011 | Maalouf et al. |
| 2011/0313871 | A1 | 12/2011 | Greenwood |
| 2012/0054102 | A1 | 3/2012 | Schwartz et al. |
| 2012/0072349 | A1 | 3/2012 | Bernstein et al. |
| 2012/0123935 | A1 | 5/2012 | Brudnicki et al. |
| 2012/0173410 | A1 | 7/2012 | Gillin |
| 2012/0310744 | A1 | 12/2012 | Kim et al. |
| 2012/0317013 | A1 | 12/2012 | Luk et al. |
| 2013/0013352 | A1 | 1/2013 | Fisher |
| 2013/0073347 | A1 | 3/2013 | Bogaard et al. |
| 2013/0080331 | A1 | 3/2013 | Granbery et al. |
| 2013/0103482 | A1 | 4/2013 | Song et al. |
| 2013/0132274 | A1 | 5/2013 | Henderson et al. |
| 2013/0132854 | A1 | 5/2013 | Raleigh et al. |
| 2013/0198076 | A1 | 8/2013 | Zambelli Hosmer et al. |
| 2013/0218721 | A1 | 8/2013 | Borhan et al. |
| 2013/0218757 | A1 | 8/2013 | Ramanathan et al. |
| 2013/0226318 | A1 | 8/2013 | Procyk et al. |
| 2013/0254115 | A1 | 9/2013 | Pasa et al. |
| 2013/0282589 | A1 | 10/2013 | Shoup et al. |
| 2013/0297512 | A1* | 11/2013 | Phillips .................. G06Q 40/02 705/44 |
| 2013/0332293 | A1 | 12/2013 | Ran |
| 2013/0346222 | A1 | 12/2013 | Ran |
| 2014/0172551 | A1 | 6/2014 | Desai et al. |
| 2014/0195272 | A1 | 7/2014 | Sadiq et al. |
| 2014/0207683 | A1 | 7/2014 | Bailey et al. |
| 2014/0249948 | A1 | 9/2014 | Graylin et al. |
| 2014/0258055 | A1 | 9/2014 | Wolfe et al. |
| 2014/0279113 | A1* | 9/2014 | Balasubramanian ....... G06Q 20/3224 705/21 |
| 2014/0310113 | A1 | 10/2014 | Sengupta et al. |
| 2014/0312118 | A1 | 10/2014 | Marcus et al. |
| 2014/0344151 | A1 | 11/2014 | Soundararajan |
| 2014/0364148 | A1 | 12/2014 | Block et al. |
| 2014/0375428 | A1 | 12/2014 | Park |
| 2015/0041534 | A1 | 2/2015 | Rayner et al. |
| 2015/0074366 | A1 | 3/2015 | Calciu et al. |
| 2015/0081557 | A1 | 3/2015 | Kinfoil et al. |
| 2015/0106216 | A1 | 4/2015 | Kenderov |
| 2015/0106260 | A1 | 4/2015 | Andrews et al. |
| 2015/0120560 | A1 | 4/2015 | Fisher et al. |
| 2015/0220925 | A1 | 8/2015 | Brickell et al. |
| 2015/0242662 | A1 | 8/2015 | Claessen |
| 2015/0254662 | A1* | 9/2015 | Radu ................ G06Q 20/3672 705/21 |
| 2015/0277967 | A1 | 10/2015 | Calciu et al. |
| 2015/0332223 | A1 | 11/2015 | Aaron et al. |
| 2015/0339648 | A1 | 11/2015 | Kushevsky et al. |
| 2015/0379506 | A1 | 12/2015 | Griffin |
| 2016/0050203 | A1 | 2/2016 | Hefetz |
| 2016/0055538 | A1 | 2/2016 | Todasco |
| 2016/0063480 | A1 | 3/2016 | Ballesteros et al. |
| 2016/0117670 | A1 | 4/2016 | Davis |
| 2016/0140545 | A1* | 5/2016 | Flurscheim ........... H04L 9/3234 705/76 |
| 2016/0142174 | A1 | 5/2016 | Fine et al. |
| 2016/0227359 | A1 | 8/2016 | Hurewitz et al. |
| 2017/0004475 | A1 | 1/2017 | White et al. |
| 2017/0006048 | A1* | 1/2017 | Garrett ................ G06Q 20/102 |
| 2017/0076291 | A1 | 3/2017 | Cairns |
| 2017/0091765 | A1 | 3/2017 | Lloyd et al. |
| 2017/0200144 | A1 | 7/2017 | Chatterton |
| 2017/0243224 | A1* | 8/2017 | Kamal ............... G06Q 20/3224 |
| 2017/0262827 | A1 | 9/2017 | Lee |
| 2018/0018704 | A1 | 1/2018 | Tunnell et al. |
| 2018/0315038 | A1 | 1/2018 | Rezayee |
| 2018/0268408 | A1 | 9/2018 | Botros et al. |
| 2019/0021133 | A1 | 1/2019 | Vandenheste |
| 2019/0287108 | A1 | 9/2019 | White et al. |
| 2019/0347661 | A1 | 11/2019 | Grenader et al. |

(56) References Cited

U.S. PATENT DOCUMENTS

| | | | |
|---|---|---|---|
| 2019/0385160 A1* | 12/2019 | Safak | G06Q 20/3829 |
| 2020/0034822 A1 | 1/2020 | Rezayee et al. | |
| 2023/0230095 A1* | 7/2023 | Koeppel | G06Q 20/4012 |
| | | | 235/380 |

FOREIGN PATENT DOCUMENTS

| | | | |
|---|---|---|---|
| WO | 2014/174261 A1 | 10/2014 | |
| WO | WO-2016134400 A1 * | 9/2016 | G06Q 20/341 |
| WO | 2018/125444 A1 | 7/2018 | |
| WO | 2018/175462 A1 | 9/2018 | |
| WO | 2018/200962 A1 | 11/2018 | |

OTHER PUBLICATIONS

Final Office Action mailed Jun. 8, 2020, for U.S. Appl. No. 15/476,705, of Yip, T., et al., filed Mar. 31, 2017.
Final Office Action mailed Jun. 16, 2020, for U.S. Appl. No. 15/489,700, of Lee, R., filed Apr. 17, 2017.
Bhatla T.P., et al., "Understanding Credit Card Frauds," Jun. 2003, Tata Consultancy Services, 17 pages.
"Clemson University Parking Services Parking Citations," Clemson University, dated Dec. 5, 2010, pp. 1-2.
"EMV Integrated Circuit Card Specifications for Payment Systems; Book 3: Application Specification," dated Jun. 2008, Version 4.2, Section-10.5, pp. 1-238.
Novak, E.J., "Security and Privacy for Ubiquitous Mobile Devices," The College of William and Mary, dated 2016, Retrieved from the Internet URL: https://search.proquest.com/docview/183158787 5/ED0257082428464BPQ/8?accountid=14753, on Jan. 17, 2018, pp. 1-2.
"PIN Bypass in the U.S. Market," EMV Migration Forum White Paper, dated Feb. 2016, Version 1.1, retrieved from Internet URL: https://web.archive.org/web/20161020113903/http://www.emv-connection.com:80/downloads/2016/02/PIN-Bypass-WP-V1.1-Public-Release-FINAL-February-2016.pdf, on May 28, 2018, pp. 1-12.
Non-Final Office Action mailed Dec. 11, 2014, for U.S. Appl. No. 14/323,747, of Wagner, D.R., filed Jul. 3, 2014.
Non-Final Office Action mailed Mar. 12, 2015, for U.S. Appl. No. 14/455,577, of Bekmann, J., et al., filed Aug. 8, 2014.
Final Office Action mailed Apr. 23, 2015, for U.S. Appl. No. 14/323,747, of Wagner, D.R., filed Jul. 3, 2014.
Final Office Action mailed Sep. 24, 2015, for U.S. Appl. No. 14/455,577, of Bekmann, J., et al., filed Aug. 8, 2014.
Non-Final Office Action mailed Oct. 21, 2015, for U.S. Appl. No. 14/323,747, of Wagner, D.R., filed Jul. 3, 2014.
Non-Final Office Action mailed Oct. 23, 2015, for U.S. Appl. No. 14/307,334, of Chen, G.H., et al., filed Jun. 17, 2014.
Advisory Action mailed Jan. 5, 2016, for U.S. Appl. No. 14/455,577, of Bekmann, J., et al., filed Aug. 8, 2014.
Final Office Action mailed Mar. 23, 2016, for U.S. Appl. No. 14/323,747, of Wagner, D.R., filed Jul. 3, 2014.
Non-Final Office Action mailed Apr. 22, 2016, for U.S. Appl. No. 14/455,577, of Bekmann, J., et al., filed Aug. 8, 2014.
Final Office Action mailed May 20, 2016, for U.S. Appl. No. 14/307,334, of Chen, G.H., et al., filed Jun. 17, 2014.
Notice of Allowance mailed Aug. 18, 2016, for U.S. Appl. No. 14/455,577, of Bekmann, J., et al., filed Aug. 8, 2014.
Advisory Action mailed Aug. 25, 2016, for U.S. Appl. No. 14/307,334, of Chen, G.H., et al., filed Jun. 17, 2014.
Non-Final Office Action mailed Feb. 27, 2017, for U.S. Appl. No. 14/307,334, of Chen, G.H., et al., filed Jun. 17, 2014.
Non-Final Office Action mailed Mar. 2, 2017, for U.S. Appl. No. 15/390,918, of Baig, R., et al., filed Dec. 27, 2016.
Non-Final Office Action mailed Mar. 17, 2017, for U.S. Appl. No. 14/553,704, of Mocko, C.L., et al., filed Nov. 25, 2014.
Notice of Allowance mailed Aug. 3, 2017, for U.S. Appl. No. 14/553,704, of Mocko, C.L., et al., filed Nov. 25, 2014.
Non-Final Office Action mailed Aug. 28, 2017, for U.S. Appl. No. 14/562,285, of Ishaq, N., filed Dec. 5, 2014.
Notice of Allowance mailed Aug. 30, 2017, for U.S. Appl. No. 14/307,334, of Chen, G.H., et al., filed Jun. 17, 2014.
Final Office Action mailed Sep. 11, 2017, for U.S. Appl. No. 15/390,918, of Baig, R., et al., filed Dec. 27, 2016.
Non-Final Office Action mailed Oct. 6, 2017, for U.S. Appl. No. 15/476,657, of Yip, T., et al., filed Mar. 31, 2017.
Advisory Action mailed Dec. 27, 2017, for U.S. Appl. No. 15/390,918, of Baig, R., et al., filed Dec. 27, 2016.
Final Office Action mailed Dec. 29, 2017, for U.S. Appl. No. 14/562,285, of Ishaq, N., filed Dec. 5, 2014.
Notice Of Allowance mailed Jan. 26, 2018, for U.S. Appl. No. 15/390,918, of Baig, R., et al., filed Dec. 27, 2016.
Final Office Action mailed Mar. 28, 2018, for U.S. Appl. No. 15/476,657, of Yip, T., et al., filed Mar. 31, 2017.
Advisory Action mailed Mar. 30, 2018, for U.S. Appl. No. 14/562,285, of Ishaq, N., filed Dec. 5, 2014.
Advisory Action mailed Jun. 25, 2018, for U.S. Appl. No. 15/476,657, of Yip, T., et al., filed Mar. 31, 2017.
Notice of Allowance mailed Aug. 15, 2018, for U.S. Appl. No. 15/087,698, of White, M.W., et al., filed Mar. 31, 2016.
Non-Final Office Action mailed Jan. 22, 2019, for U.S. Appl. No. 14/562,285, of Ishaq, N., filed Dec. 5, 2014.
Non-Final Office Action mailed May 6, 2019, for U.S. Appl. No. 15/489,700, of Lee, R., filed Apr. 17, 2017.
Final Office Action mailed May 13, 2019, for U.S. Appl. No. 14/562,285, of Ishaq, N., filed Dec. 5, 2014.
Non-Final Office Action mailed Jun. 3, 2019, for U.S. Appl. No. 15/581,972, of Rezayee, A., et al., filed Apr. 28, 2017.
Non-Final Office Action mailed Jun. 6, 2019, for U.S. Appl. No. 15/476,657, of Yip, T., et al., filed Mar. 31, 2017.
Notice of Allowance mailed Aug. 13, 2019, for U.S. Appl. No. 14/562,285, of Ishaq, N., filed Dec. 5, 2014.
Non-Final Office action mailed Sep. 27, 2019, for U.S. Appl. No. 15/464,079, of Botros, P.A., et al., filed Mar. 20, 2017.
Final Office Action mailed Oct. 8, 2019, for U.S. Appl. No. 15/489,700, of Lee, R., filed Apr. 17, 2017.
Final Office Action mailed Nov. 4, 2019, for U.S. Appl. No. 15/476,657, of Yip, T., et al., filed Mar. 31, 2017.
Non-Final Office Action mailed Nov. 18, 2019, for U.S. Appl. No. 15/476,705, of Yip, T., et al., filed Mar. 31, 2017.
International Search Report and Written Opinion for International Application No. PCT/US2017/063054, mailed Feb. 13, 2018.
International Search Report and Written Opinion for International Application No. PCT/US2018/023392, mailed Jun. 11, 2018.
International Search Report and Written Opinion for International Application No. PCT/US2018/029807, mailed Jul. 26, 2018.
Brown C., "Netcom Unveils NFC MicroSD Add-on," Downloaded from https://www.nfcw.com/2011/06/06/37813/netcom-nfc-microsd-add-on/, Jun. 6, 2011.
Rao L.., "Paypal Debuts its Newest Hardward, Beacon, A Bluetooth LE Enabled Device for Hands-Free Check Ins and Payments," http://techcrunch.com/2013/09/09palpal-debuts-its-newest-hardware-beacon-a-bluetooth-le-enabled-device-for-hands-free-check-ins-and-payments, Sep. 9, 2013.
Square—Pay-by-Name, Uploaded on Youtube.com by AppJudgment, Sep. 7, 2011).
Unknown, "Beacon Paypal," Retrieved from the Internet—URL: http://www.paypal.com/webapps/mpp/beacon, Jul. 17, 2014, pp. 1-4.
Advisory Action mailed Dec. 20, 2019, for U.S. Appl. No. 15/489,700, of Lee, R., filed Apr. 17, 2017.
Notice of Allowance mailed Apr. 13, 2020, for U.S. Appl. No. 15/476,657, of Yip, T., et al., filed Mar. 31, 2017.
Final Office Action mailed Jan. 10, 2020, for U.S. Appl. No. 15/581,972, of Rezayee, A., et al., filed Apr. 28, 2017.
Non-Final Office Action mailed Jan. 15, 2020, for U.S. Appl. No. 15/489,700, of Lee, R., filed Apr. 17, 2017.
Notice of Allowance mailed Feb. 12, 2020, for U.S. Appl. No. 15/476,657, of Yip, T., et al., filed Mar. 31, 2017.
Bank of America Corporation; Patent Issued for Dynamic Authentication Engine (Jun. 19, 2014), Computer Weekly News Retrieved

(56) References Cited

OTHER PUBLICATIONS from http://dialog.proquest.com/Professional/docview/1534570020?accountid=131444 on Feb. 6, 2020 (Year: 2014).

\* cited by examiner

CONFIGURING VERIFICATION INFORMATION AT POINT-OF-SALE DEVICES

PRIORITY

This application is a continuation of, and claims priority to, U.S. patent application Ser. No. 15/464,079, filed on Mar. 20, 2017, entitled "Configuring Verification Information At Point-of-Sale Devices", with is incorporated by reference herein in its entirety.

BACKGROUND

In today's commerce, merchants often utilize an array of different point-of-sale (POS) devices, including mobile POS devices. Merchants may use these POS devices to engage in transactions with customers at different locations. For instance, a taxi driver may use a mobile POS device to charge a passenger for a taxi ride. In another example, a street vendor may use a mobile POS device to charge a customer for an item purchased from the street vendor. In yet another example, a merchant may use a stationary POS device to process a payment transaction at a store. Operators of traditional payment infrastructure, such as card networks and issuing banks, often struggle to adapt to this changing landscape of POS devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
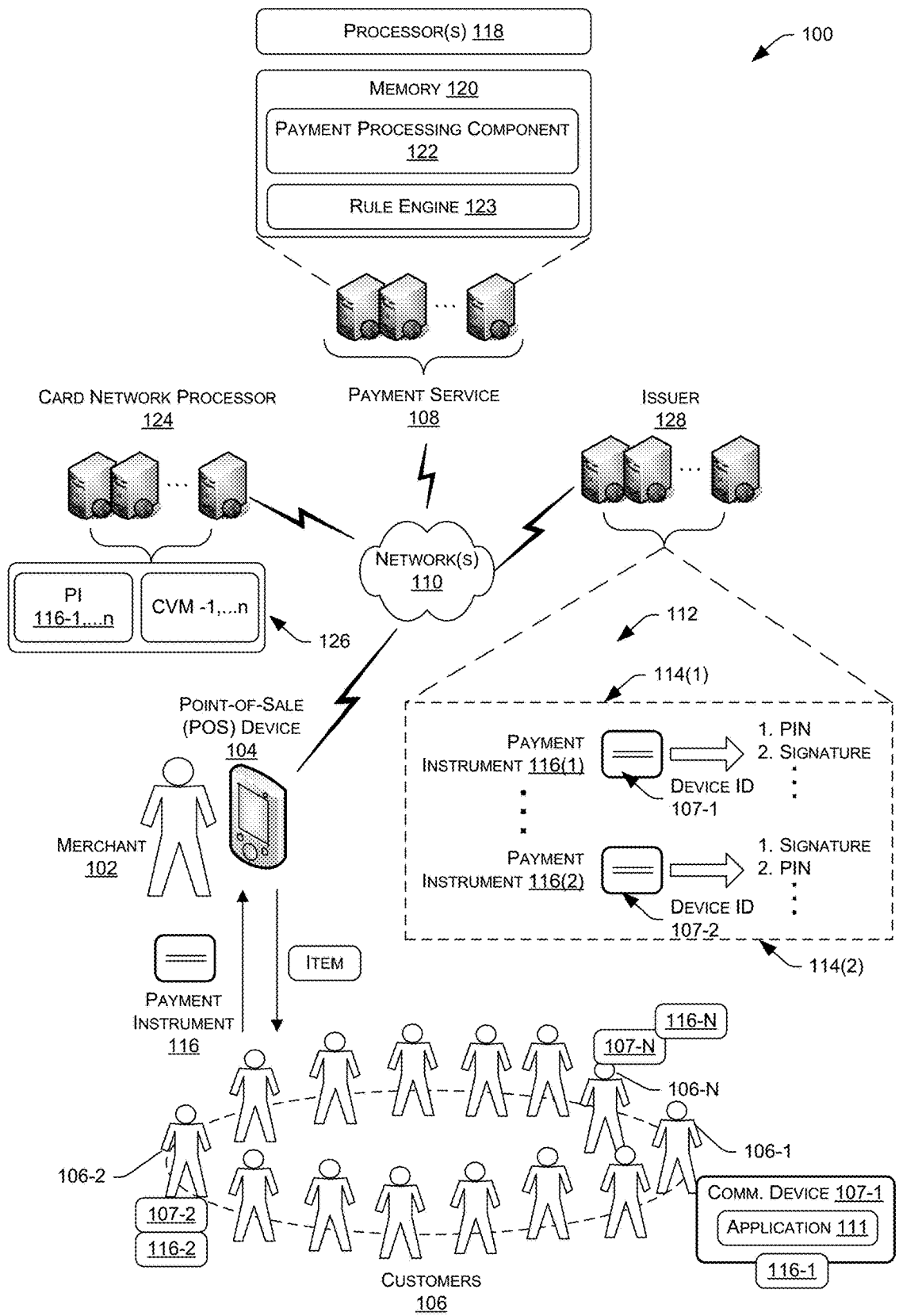
FIG. 1 illustrates an example environment that includes a merchant operating a mobile point-of-sale (POS) device to conduct transactions with multiple different customers. In some instances, the POS device dynamically configures verification information to request from the customers that a cardholder verification method (CVM) specifies. For instance, the POS device, payment server, or an issuing bank may determine, based on a type of payment instrument provided by a customer and risk analysis of the payment instrument, whether to request verification information as specified by a default CVM, configure the CVM or ignore CVM requirement altogether.

Some implementations described herein include techniques and arrangements for dynamically configuring and/or reconfiguring verification information at point-of-sale (POS) devices based on a payment instrument presented at the time of a payment transaction and at a specific location.

In an example scenario, a customer presenting a credit card while holding a device executing an application of the entity that issued the credit card, may not provide a primary or secondary verification. On the other hand, a customer presenting a credit card in the absence of a registered mobile device or mobile device executing a registered application with the issuing entity, may be asked to provide a primary or secondary verification, for example a PIN or signature, or a PIN followed by signature, based on a risk rating of the transaction.

As described herein, a POS device may be programmed to implement a cardholder verification method (CVM) that specifies the POS device to request verification information from a customer engaging in a transaction at the POS device, where the verification information or request for verification information that is specific to the customer, transaction or an attribute of the payment instrument. For instance, the POS device may initially receive (e.g., via a swipe, a dip, manual entry, etc.) information from a payment instrument (e.g., credit card, bank card, debit card, etc.). The POS device may then, with the issuing entity and a payment server, determine whether the POS device can request additional, different or no verification information and, if so, the manner and kind of information to request. This additional verification information may comprise a personal identifier number (PIN) associated with the payment instrument, a signature of the cardholder, an answer to a security question associated with the cardholder, biometric information from the cardholder, a combination of any of the above, or even absence of any CVM. For example, if the issuing bank determines the risk of the transaction to be lower than a threshold value, the POS device may process the transaction without CVM and under the condition that the issuing entity will approve the transaction absent CVM.

In one implementation, various conditions may trigger configuration or reconfiguration of CVM. In one example, the trigger condition may be based on detection of a registered mobile device at the time of a payment transaction, i.e., if the card holder has registered with the payment server its mobile device and/or associated the mobile device with the payment instrument. In another example, the trigger condition may be based on detection of a financial application, such as an application that facilitates management of payment transactions using the payment instrument, installed on a device associated with the user or any device at the location where the transaction is taking place. In some implementations, instead of relying on presence of a device, the trigger condition may be based on an absence of a registered device or financial or payment application.

Before requesting the verification information, however, a POS device as described herein may determine, based on one or more attributes of a received payment instrument, specifications or capabilities of the receiving POS device, risk logic implemented by a payment server, and/or the like, whether to request CVM, modify default CVM into a specific CVM, or change the order of CVM for a specific cardholder, payment instrument or transaction. For instance, while the CVM may initially instruct a POS device to request a PIN number from a cardholder, the processor of the issuing entity may determine that the CVM order should be modified such that a signature is requested rather than the PIN. After determining whether to modify the CVM order, the POS device may request verification in accordance with the (potentially modified) order. For instance, the POS device may request first verification information from the user, followed by second verification information if the first verification information does not authorize the transaction, and the like, until the transaction/payment instrument is authorized or each piece of verification information from the CVM has been requested.

In another example, the CVM may initially instruct the POS device to request a specific set of inputs, such as a PIN and signature of the user, however, if the issuing entity detects a payment application executing on a device registered with the user or user's payment instrument and in proximity to the POS device, the issuing entity may generate a CVM specific to the payment instrument, or even relax the requirement of CVM.

In one implementation, the POS device (or a payment card reader) detects devices in proximity to itself, for example through sensors, transmitters, receivers, antenna, etc. The POS device can also, additionally or optionally, obtain device information, such as device identifier, device type, etc. The POS device may be triggered to obtain device information when a user presents a payment instrument for payment of a payment transaction, or otherwise approaches a payment reader or POS device. In this manner, the most proximate communication device to the POS device, in the context of the current payment transaction or payment instrument, can be determined. The POS device extracts payment information, such as the payment card number, the verification number, the cardholder identifier such as name, etc., and the device information. The POS device sends the payment information, including the cardholder identifier and device information, to the issuing entity, for example through an intermediate entity such as acquirer, processor of card processing network, and the payment processing server. The issuing entity, based on the payment information or the cardholder identifier, determines whether a device is registered with the cardholder and/or a financial application is installed on the device registered with the cardholder. The issuing entity then contacts or otherwise communicates with the registered device to determine its location.

In another example, the issuing entity has access to the location of the communication device, for example through a previous registration, and does not need to explicitly communicate with the device for location information. Using the location information of the registered device, the issuing entity determines whether the location is the same as the location of the payment transaction (indicated by the POS device, proximate devices, payment instrument or a chip therein) and if the location matches or is otherwise similar, the issuing entity may reconfigure the CVM requirement to be specific to the payment instrument. In one instance, the issuing entity may determine a risk score to be lower than a threshold value and even remove the requirement to request CVM because the issuing entity has enough information to tag the transaction as sufficiently secure. In another instance, the payment server or POS device may reconfigure the CVM as per location determination and comparison made by the issuing entity. By configuring the CVM based on previously collected data or historical trends or patterns, such as location information or purchasing habits, merchant type, etc., the user need not provide CVM thereby making the payment transaction experience seamless and frictionless. The CVM is generally specific to the card network however based on the disclosure herein, the CVM can be configured to be a different CVM or no CVM as the case may be.

In some implementations, if the location of the registered device is substantially dissimilar from the location of the devices where the payment transaction is occurring or has occurred, the CVM specified by the card network can be applied. Alternatively, a more stringent CVM or multiple rounds of authentication can be requested to further secure the payment transaction.

Thus, dynamically reconfiguring CVM may result in a more efficient and seamless transaction between a merchant and a customer. To provide an example, payment instruments associated with a particular card network might not accept certain verification information when input into a particular type of POS device. For instance, the card network might not accept PIN numbers entered into a device that does not include a dedicated hardware device for receiving PIN numbers (but that instead includes a touch screen or the like for receiving this information). Therefore, a POS device may determine when it receives a payment instrument associated with this card network and may dynamically reconfigure the CVM after processor of the issuing entity has executed a risk check and determined secondary means to authenticate the transaction (for example, based on location of the payment transaction or historical trends associated with the user, user's payment instrument or even the merchant. For instance, knowing that the card network will not accept a PIN entered at the POS device and based on a confirmation that the cardholder is carrying a device previously registered with the issuing entity or a device executing an application associated with the issuing entity, the issuing entity, via the POS device, may reorder the CVM, which may include removing "PIN" as a type of verification information to request and moving "signature" into a first slot in the order. The POS device may then request a signature in lieu of a PIN, thus avoiding the situation where a cardholder enters her PIN, learns from the merchant that the PIN has not been accepted, and then is asked to provide a signature. Instead, the POS device will skip straight to requesting a signature form the cardholder, thus resulting in a quicker transaction that potentially prevents embarrassment to the merchant and/or the cardholder, but without risking the security of the payment transaction. The transaction, when sent for processing, may include data or a flag that indicates that the issuing entity had approved a modified CVM based on the location of the payment instrument, registration of the user's device, and other such factor. The card network can use this data to process the transaction in the absence of CVM typically enforced by the card network.

Furthermore, the systems and methods described herein improve and simplify authentication that in turn will reduce observed fraud. Currently, without PIN for high ticket transactions, networks either default to less secure forms of authentication (and take the liability) or use alternate hardware (or in the most extreme case cannot accept the transaction). Both of these options are not ideal and also some CVMs may slow down the transaction time or make it less secure. To this end, the open payment platform described herein is designed to work with all mobile devices, any issuer, and is extensible to other platforms. Some implementations describe payment applications to be installed on user phone. As such, the implementations are aligned with longer term industry trends involving use of mobile devices and greater consumer control in the payment process, moving payments to the buyer. Such implementations also provide flexibility for any changes as the rule engine may reside in the server or the issuer and move away from the POS terminal.

Some of the implementations offer dynamic risk controls to allow the issuers to dynamically set and control authentication limits, manage risk, and assign CVMs accordingly. The dynamic risk controls are based on one or more attributes, such as merchant attribute, e.g., merchant code, geography, observed fraud, buyer attribute, e.g., credit line, credit balance, and risk profile based on current and/or past transactions, authentication method, e.g., geo-location, biometric input, one time password or text message, etc.

Some implementations also offer increased engagement with the banking infrastructure thus driving more users to the platform, for example more users engage with the mobile payment applications, which are the main touch point for customers, which in turn increases the propensity for updated contact details and also gives the issuers the opportunity to display other data as part of the transaction, e.g., balance, last time visited, etc. The implementations described herein offer options to perform authentication for the payment flow with other terminals that may or may not be connected to the existing payment infrastructure.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Various embodiments and implementations of the disclosed custom and/or dynamic authentication technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, merchants, or other agents of the merchant and thus no distinction is made herein unless specifically discussed. In addition, as used herein, a buyer or customer or user may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires an item from a merchant, and in return, the buyer provides payment to the merchant, for example through a payment instrument issued by an issuing entity.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment instrument or a payment proxy for the payment instrument. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

The term 'payment card,' 'payment instrument,' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or username, a forum, a messaging application, and so on.

The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc. Accordingly, the CVM can include a PIN, signature, or a biometric input, such as a fingerprint or iris scan.

The payment object reader may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader may include hardware implementation, such as slots, magnetic tracks, and rails with one or more sensors or electrical contacts to facilitate detection and acceptance of a payment object. Additionally or optionally, the payment object reader may also include a biometric sensor to receive and process biometric characteristics and process them as payment instruments, given that such biometric characteristics are registered with the payment processing system and connected to a financial account.

In one example, the POS terminal can be a hand-held device such as a mobile phone, laptop, tablet computer, and the like, associated with a merchant. In another example, the POS terminal is a mobile device that is wearable or otherwise connected to or associated with the buyer or merchant, for example, the computing device may be an Apple® watch or a Fitbit®.

As used herein, the term 'payment application' or 'financial application' includes any application configured for management of payment transactions connected to a payment instrument or multiple payment instruments issued by a single entity or multiple entities to a user. The financial application can also provide the user with financial information, option to open an account with the issuing entity, dispense physical cash, transfer cash electronically, pay bills, apply for loans, make deposits, obtain assistance from the agent, monitor spending habits, get financial advice, set spending goals, manage transaction and spending limits, and the like. The term "payment application" as used here, can also refer to or include any messaging application that enables communication between users (e.g., sender and recipient of a message) over a wired or wireless communications network, or devices, for example between an issuing entity and the user's communication device. A payment processing system that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. The message can also be to confirm the location of the user or obtain an approval to extract location of the user. Although this specification may employ text messages as an example, it is to be understood that the technology may employ any of these types of messages. Upon receiving an indication to send (e.g., after detecting that the user has clicked "Send"), the messaging application transmits a message, e.g., the text message to a messaging application computer system ("messaging application system").

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired." The pairing technology described herein can pair a payment object reader to the POS terminal in both real-time and offline modes. Furthermore, even though Bluetooth or Bluetooth Low Energy has been used to describe certain embodiments, other wireless protocols, such as NFC, Wi-Fi, etc., can also be used.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "swipe" here refers to any manner of triggering a payment object reader to read data from a payment object, such as by dipping into, tapping, hovering, bringing in close contact or passing the payment object into or through a payment object reader.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the figures, FIG. 1 illustrates an example environment 100 that includes a merchant 102 operating a point-of-sale (POS) device 104 to engage in various transactions with customers 106-1, 106-2, . . . , 106-N (collectively referred to as customers 106) equipped with communication devices 107-1, 107-2, . . . 107-N (collectively referred to as communication devices 107) and payment instruments 116-1, 116-2, . . . 116-N (collectively referred to as payment instruments 116).

As used herein, a merchant 102 may include any business engaged in the offering of goods or services for acquisition by customers. Actions attributed to a merchant 102 may include actions performed by owners, merchants, or other agents of the merchant 102 and thus no distinction is made herein unless specifically discussed. In addition, as used herein, a customer 106 may include any entity that acquires goods or services from a merchant 102, such as by purchasing, renting, leasing, borrowing, licensing, or the like. Hereinafter, goods and/or services offered by merchants 102 may be referred to as items. Thus, a merchant 102 and a customer 106 may interact with each other to conduct a transaction in which the customer 106 acquires an item from a merchant 102, and in return, the customer 106 provides payment to the merchant 102 through a payment instrument 116.

The customers 106 may be equipped with payment instruments 116, such as credit card, debit card, gift card, near-field communication (NFC) based payment instrument, and the like, and communication devices 107, such as smart phones, tablet computers, laptops, mobile wearable devices like Apple® watch or a Fitbit®, or other mobile data processing apparatus, that may have executing or installed thereon one or more web or mobile applications to support various functionalities. The communication devices 107 may be configured to respond to requests from other devices, such as the POS device 104 to provide its exact location, approximate location, or location relative to another device. In some implementations, the communication device 107 may allow other devices to check whether or not the device 107 is within a marked geo-fence. The POS device 104 or the communication device 107 may hereinafter also be referred to as the payment device.

The communication device 107 may also have executing or installed thereon payment applications 111. The payment application 111 can include an interface for the user to select the payment instrument 116 or otherwise track transactions made through the payment instrument 116. In one implementation, multiple payment instruments 116, issued by the same or different issuing entity, can be accessed by a single payment application 111. In some implementations, the payment application 111 can be an instance of the payment instrument, for example a virtual wallet. When the payment application, for example a web or mobile application, is installed on the device 107, for example by accessing a download feature followed by an optional registration process, the payment application 111 may be associated with the payment instrument 116, the device or its identifier, and the entity that has issued the payment instrument, for example, issuer 128, through the process of registration. The registration process may also trigger the user to allow the issuer 128 to obtain and store the device information (e.g., device identifier), environment information (e.g., location of the point of transaction, location of device, or location of the payment instrument, etc.), or the user information (location of the user, user identifier, etc.) indicative of the device.

Also, in some cases, the issuer 128 may also store information of the issuer-device relationship in the device. Such information may be correlated with the user data and saved in the issuer 128. The processor of the issuing entity, herein referred to as issuer 128, may include a rule engine (not shown) to map received data from the user or user device with a stored value of the user and device association, for example, to confirm whether a prior relationship exists and based on that, further determine a level of risk associated with the transaction. If the level of risk is lower than a predetermined threshold, for example, as set by the card processing network or the issuer, the issuer 128 can remove the requirement for a CVM as dictated by the card processing network or even change the CVM. Alternatively, if the level of risk is higher or equal to the predetermined threshold, the issuer 128 can again either apply a stringent or multi-level CVM or even decline the transaction as being too risky. While some embodiments describe confirmation of a user device to be present at the time of payment transaction, this is no way should limit the present subject matter. In some implementations, for example, the issuer checks whether a payment application or an identifier is trackable irrespective of where the device is present at the time of payment transaction. For example, the issuer sends a query to the device on record to determine whether it is a legitimate device and subsequently configures the CVM or requirement for CVM. Approval via geo-location (and other forms of location) can be so seamless the buyer does not necessarily need have their phone in hand. Without knowing, the users can have an extremely secure transaction.

As used herein, a transaction may include a financial transaction for the acquisition of goods and/or services that is conducted between the customer and the merchant. For example, when paying for a transaction, the customer can provide the amount that is due to the merchant using a payment instrument 116 (e.g., a debit card, a credit card, a stored-value or gift card, a check, through an electronic payment application on a device carried by the customer, or the like). The merchant 102 can interact with the POS device 104 to process the transaction, such as by inputting (e.g., manually, via a magnetic card reader or an RFID reader, etc.) an identifier associated with the payment instrument 116. For example, a payment instrument 116 of one of the customers 106 may include one or more magnetic strips for providing card and customer information when swiped in a card reader. In other examples, other types of payment cards may be used, such as smart cards having a built-in memory chip that is read by the device 104 when the card is "dipped" into the reader, or tapped onto a surface or in proximity to the surface of the reader having a radiofrequency identification tag, or so forth. Accordingly, the attribute of the payment instrument can be an identifier that indicates whether the instrument has a magnetic strip or a chip and information stored thereon. The attribute can also be a cost of the payment transaction for which the payment instrument is being authorized, a hardware capability of the POS device, that is whether the POS device is capable of accepting EMV cards, magnetic cards, NFC based instruments, and so on, the location of the payment transaction, and the identity of the entity issuing the payment instrument.

Figure 4:
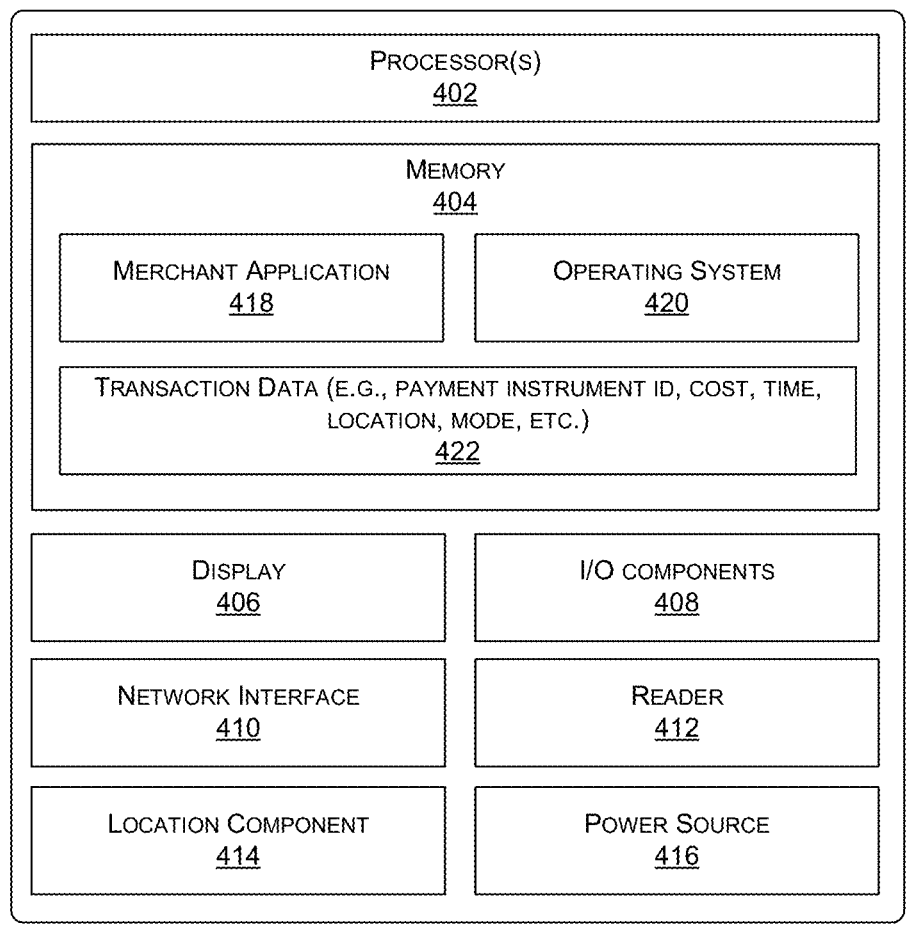
FIG. 4 illustrates select components of a POS device that a merchant described herein may utilize.

The POS device 104 may comprise any sort of mobile or non-mobile device that includes an instance of a merchant application that executes on the respective device (as illustrated in FIG. 4). The merchant application may provide POS functionality to the POS device 104 to enable the merchant 102 (e.g., an owner, merchants, etc.) to accept payments from the customers 106. In some types of businesses, the POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, a cab driver, etc., or has an otherwise mobile business, e.g., in the case of merchants who sell items at buyer's homes, places of business, and so forth.

In some implementations, the POS device 104 may include sensors (not shown), such as accelerometers, microphones, GPS/location sensors, light detection sensors, proximity sensors, gravity detection sensors, magnetic field detection sensors, electrical field detection sensors, vibration sensors, pressure sensors, humidity sensors, and the like, to measure a physical quantity and convert it into a signal that may be used to detect exact, approximate, or relative location of devices from the device 104. The location sensors may be internal and/or external to the device 104. Exemplary location sensors include, but are not limited to, a cellular radio or modem, a GPS receiver, a Wi-Fi adapter or modem, a BLUETOOTH brand communication service element, a three-dimensional motion sensor, or the like. In one implementation, the device 104 can also set up a geo-fence and detects one or more devices that enter and/or exit the geo-fence. As such, the location of the device 104 may represent a status (e.g., inside and/or outside the geo-fence) or an actual determination location (e.g., coordinates). The device 104 may perform particular actions based on the determined location of the devices relative to the geo-fence. In some implementations, the device 104 detects the location and saves the information both on the POS device 104 and the issuer 128. The POS device 104 is also configured to receive a payment instrument or multiple payment instruments to satisfy at least a portion of the cost of the payment transaction. For example, a single payment card or several cards or other payment objects may be used in a single payment transaction. The cost may be split between several cards based on incentives associated with the cards or availability of funds on accounts connected to the cards.

During the transaction, the POS device 104 can obtain payment transaction information describing the transaction, such as the attribute or identifier of the payment instrument, identity of the customer based on identifier of the payment instrument, identity of the customer based on information in track or records of the payment instrument, an amount of payment received from the customer, the item(s) acquired by the customer, a time, place and date of the transaction, a card network associated with the payment instrument, an issuing bank of the payment instrument, and so forth.

In one implementation, the POS device 104 can also determine information related to devices surrounding or in proximity to the POS device 104. For example, the sensors, such as location sensors, global positioning systems (GPS) units, Wi-Fi Positioning Systems (WPS), etc., of the POS device 104 can detect surrounding or proximate devices based on location detection protocols, including triangulation triangulation, trilateration, multi-laterations, geo-fence, global or local positioning systems, and by leveraging device profile obtained through the sensors. According to related aspects of the present subject matter, triangulation of data may be by "direct" triangulation, e.g., as where the identity of the buyer device is determined from the point of intersection (or the point of least squares fit) of multiple device profiles. Alternatively, or in addition, triangulation may be "indirect," as where the identity of the buyer device is determined not only from the device profiles, but also from relative profiles originating from other devices in the proximity or even historical purchases. The present subject matter also includes implementations where locations are reported by other buyer devices in a "crowdsourced" manner. The POS device 104 can send the transaction information and location information to a payment service 108 over a network 110, either substantially or contemporaneous to the conducting of the transaction (in the case of online transactions) or later when the device 104 is in the online mode (in the case offline transactions). The POS device 104 is configured to work in both offline and online modes.

In an offline mode, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers 106, the POS device 104 may provide the stored information to the payment service 108 over the network 110. The network 110 may represent any one or more wired or wireless networks, such as a Wi-Fi network, a cellular network, or the like. In an online transaction, the POS device may send this information to the payment service 108 over the network 110 substantially contemporaneously with the transaction with the customer. The payment service 108 may include a processor 118, a memory 120 having components, such as a payment processing component 122 and a rule engine 123 described later.

Generally, the CVM is static and fixed, i.e., does not vary with the user or payment instrument. By static, the CVM does not change based on the nature of transaction or the type of payment instrument. By fixed, the card network stores the CVM based on the type of card and issuer 128. The CVM can further include a specific order regardless of risk or other factors. In some instances, the POS device 104 is configured to implement a cardholder verification method (CVM) that specifies verification information (or a modified order of verification information) to request from customers and the circumstances in which to request this information, based on the attribute of the payment transaction and a risk score computed based on the obtained attribute.

For instance, the CVM may indicate that transactions for amounts over a threshold amount (e.g., $50) will only be authorized when verification information—in addition to the information stored by a customer's payment instrument—is provided by the customer. This information may include a personal identification number (PIN) associated with the payment instrument, a password with the payment instrument, a signature of the cardholder, or the like. For example, the CVM is saved against each payment instrument at the card processing network 124. For example, at 109, the card processing network 124 includes an association of the payment instrument (PI) 116(1) with a CVM-1, payment instrument 116(n) with CVM-n, and so on.

However, in certain implementations, a processor 104 associated with an issuer, may have additional insight into the payment instrument, which when compared to the data reported by the POS device 104 at the time of payment transaction can indicate a different CVM or even remove the requirement for CVM, if the risk associated with the transaction is significantly low. Furthermore, POS device 104 may be configured (e.g., via the merchant application executed on the device 104) to generate instructions that indicate a modification of an order of the CVM based on payment device or payment instrument attributes, such as a card network associated with a payment instrument/device, a brand of the payment instrument/device, an issuing bank of the payment instrument, whether the payment instrument includes a magnetic strip or a memory chip, or the like, or a new CVM altogether. For instance, FIG. 1 illustrates, at 112, that the processor of the issuing entity, also referred to as issuer 128, is configured to implement a first CVM 114(1) when the POS device 104 receives a first payment instrument 116(1), and a second CVM 114(2) when the POS device 104 receives a second payment instrument 116(2). Alternatively, in another implementation, the issuing entity 128 is configured to implement a first CVM 114(1) when the POS device 104 receives a first payment instrument 116(1) in the absence of a communication device 107-1, and a second CVM 114(2) when the POS device 104 receives a first payment instrument 116(1) in the presence of a communication device 107-1 executing an instance of a payment application irrespective of the CVM 126 imposed by the card network processor 124. In the shown example, the payment instrument 116(1) is tied to device 107-1 and such a relationship may have been established when an application 111 associated with the issuing entity 128 was installed by the customer. Similarly, the payment instrument 116(2) is associated with device 107-2 and such a relationship is also established at the time of registration of an application 111 or another device registration application or the like. Not all devices may be registered and as such the CVM recommended by the card network processor 124 is applied at the POS device 104. For devices registered with the issuer 128, the table or database 112 is used for mapping the payment instrument with device identifier, collected, for example at the time of registration, and a device-specific CVM. The issuer 128 may also compute a risk score and accordingly, select CVM best suited to the risk levels of the payment transaction.

In some instances, the first payment instrument 116(1) represents a payment instrument associated with a first card network (e.g., Visa®, MasterCard®, American Express®, Diner's Club®, Discover®, etc.), while the payment instrument 116(2) represents a payment instrument associated with a different card network. In the example, the first order 114(1) specifies that the POS device 104 is first to request a PIN from a cardholder (or "customer") first, and a signature second, and so forth. The second order 114(2), meanwhile, instructs the POS device 104 requesting a signature first. After requesting and receiving the verification information (e.g., PIN, signatures, etc.), the POS device 104 may send this information to the payment service, which in turn may attempt to authorize the transaction and send a result back to the POS device.

In some instances, the example shown at 112 represents a scenario where a card network associated with the payment instrument 114(2) does not accept PINs received from the mobile POS device 104 and, therefore, the POS device dynamically modifies the first, default order 114(1) of the CVM in response to identifying the card network associated with the second payment instrument 116(2). Further, while FIG. 1 illustrates two different payment instruments and corresponding CVM orders, it is to be appreciated that any other number of payment instruments and corresponding CVM orders may be utilized.

As illustrated, the payment service 108 may include one or more processors 118 and memory 120, which may store a payment processing component 122. The payment processing component 122 may function to receive the information regarding a transaction from the POS device 104 and attempt to authorize the payment instrument used to conduct the transaction. The payment processing component 122 may then send an indication of whether the payment instrument has been approved or declined back to the POS device 104. The payment processing component 122 is also configured to process transactions, collect information related to the transaction, parse the information, and encrypt relevant information for the issuing entity 128. The payment processing component 122 also stores the transaction information for post-transaction activities, such as pattern detection and trend analysis on transactions corresponding to the user, merchant or their locations. The rule engine 123 is configured to create various kinds of rules for a user, device, merchant, location or a particular transaction. For example, the rules can provide access to a variety of operating standards that may be applied to any given transaction between a merchant and a user, such as transaction fee, tax, etc., based on transaction or nature of transaction. The rules engine 123 may also apply a risk analysis, for example in real-time, based on anomalies in behavior of the customer or the device associated with the customer. In some implementations, the rule engine 123 is configured to detect, based on the information from the communication device 107 and/or identifiers of the payment device or instrument, whether there is a pre-existing relationship between the communication device and the payment instrument or between the communication device and the issuer 128. Even though the rule engine 123 is shown to be in the payment service 108, the rule engine 123 can also be present in the issuer 128. The rule engine 123 can determine a risk level or score associated with the payment transaction based on the pre-existing relationship, where the relationship is established at a time of registration of the payment instrument or the communication device with the payment service or issuer through, for example a payment application. The rule engine 123 can also query a device registered with the payment instrument to obtain its location, for example, or other such information to determine whether the devices in proximity to the POS device or in possession of the user compare to the location of the registered device. If the location of the device present at the location of the transaction positively matches, the rule engine 123 determines that the relationship is pre-existing.

Operationally, when a customer and a merchant enter into an electronic payment transaction, the transaction is processed by electronically transferring funds from a financial account associated with the customer to a financial account associated with the merchant. As disclosed in the present subject matter, the POS system 104, based on the transaction information, selects a card processing network 124. The card processing network 124 indicates a CVM associated with the payment instrument. In one example scenario, the payment service 108, for example through the rule engine 123, determines whether to apply new CVM, as generated by the issuer 128, based on a level or risk associated with the transaction. In another example scenario, the payment server 108 forwards the payment information, including the customer's location information, customer's device information, card type, etc., to the issuer 128. The issuer 128 based on a risk analysis or mapping of the device information to known devices, generates a new CVM, maintains the CVM dictated by the card processing network, or modifies an order of CVM. The issuer 128 may have previously collected information from customer devices at the time of registration of the card, through a customer such, the payment processing component 122 may communicate with one or more computing devices of a card network (or "card payment network"), e.g., MasterCard®, VISA®, over the network 110 to conduct financial transactions electronically. The card processing network 124 may also The payment processing component 122 can also communicate with one or more computing devices of one or more banks over the network 110. For example, the payment processing component 122 may communicate with an acquiring bank, and/or an issuing bank, and/or a bank maintaining customer accounts for electronic payments.

An acquiring bank (not shown) may be a registered member of a card association (e.g., Visa®, MasterCard®), and may be part of a card payment network. An issuing bank associated with the processor 128 may issue credit cards to buyers, and may pay acquiring banks for purchases made by cardholders to which the issuing bank has issued a payment card. Accordingly, in some examples, the computing device (s) of an acquiring bank may be included in the card payment network 124 and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

Figure 2A:
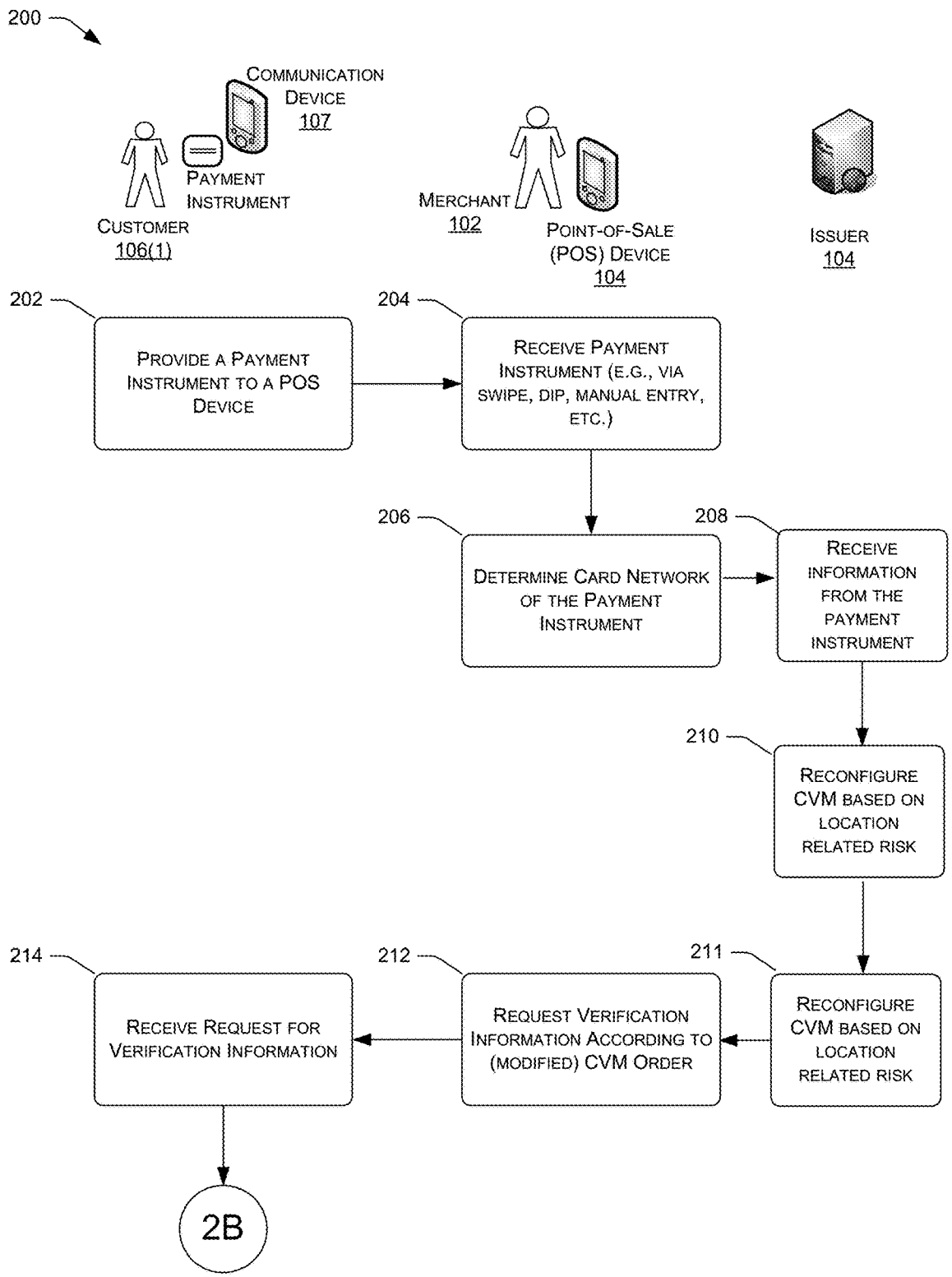
FIGS. 2A and 2B illustrate a flow diagram of a process for determining whether to request verification information as specified by a default CVM or whether to configure the CVM and request verification information in accordance with the reconfigured CVM.
Figure 2B:
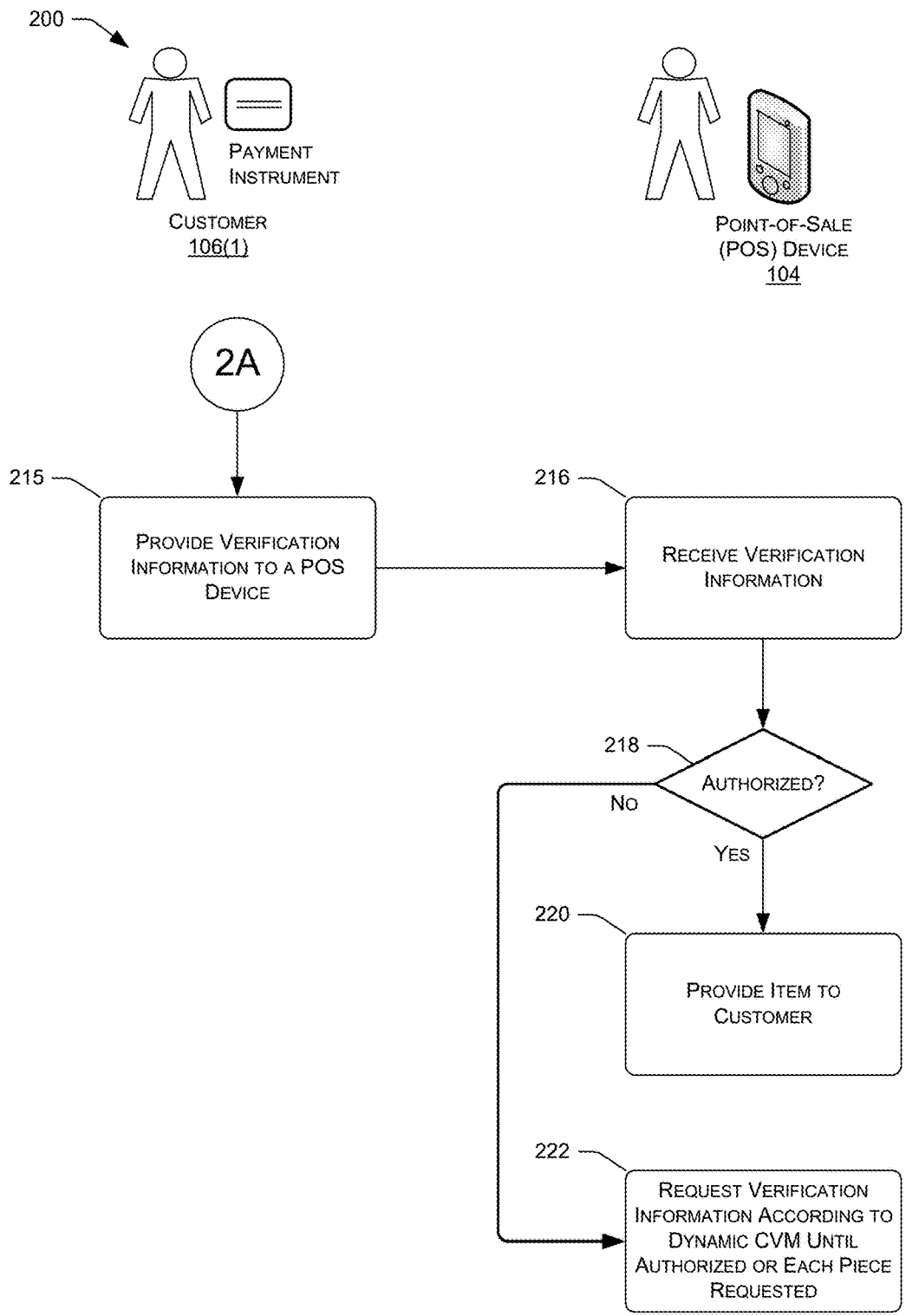

FIGS. 2A and 2B illustrate a flow diagram of a process 200 for determining whether to request verification information as specified by a default order of the CVM or whether to reconfigure CVM and request verification information in accordance with the reconfigured CVM. The process 200 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 200, and other processes described herein, may be performed by a POS device, a processor of the issuing entity, by a remote payment service (e.g., payment service 108), by another entity, or by a combination thereof.

An operation 202 represents an example customer 106(1) providing a payment instrument 116 to merchant operating a POS device 104. For instance, the customer 106(1) may provide this payment instrument to the merchant in exchange for an item (e.g., a good or service). This payment instrument may comprise a credit card, a debit card, a bank card, a gift card, a check, a virtual payment instrument, or any other type of payment instrument. Assume that the customer 106(1) is equipped with a communication device 107 having installed thereon a payment application 111.

At an operation 204, the POS device 104 receives the payment instrument and its underlying payment information, which may include the merchant swiping a magnetic strip of the payment instrument, dipping the payment instrument and its chip into the device 104, manually entering an identifier of the payment instrument, or the like. Additionally, the payment information may include card data that identifies the customer and the merchant. The payment information, in one implementation, also includes device identifier (e.g., device number, operating system, distance of the device from the POS terminal, etc.). In one example, the sensors in the POS terminal determines a geo-fence within which it then detects the proximate devices and optionally, arranges them in order of their distance from itself. While the location is one indicator of relevance of a device to the customer or transaction in process; other indicators can be used either in combination with the location information or alone.

At an operation 206, in this example the POS device 104 determines a card network associated with the payment instrument, from the information provided to the POS device 104 by the payment instrument. For instance, the POS device 104 may determine this automatically based on the merchant swiping the card, dipping the card, manually entering the identifier, or the like. In other instances, the merchant herself may manually specify the card network (or the brand) associated with the payment instrument, such as MasterCard®, Visa®, or the like. The card network may have associated with all their cards, a generic CVM, thus enforcing each customer to adhere to the same CVM irrespective of whether or not the customer has proven to be less or more risky. To this end, in one implementation, the payment information is sent to the processor of the issuing entity at operation 208. The processor of the issuing entity 128 determines whether or not to institute a CVM different from the CVM specified by the card network. The issuing entity can make this determination based on predictive and normative behavioral analysis associated with the nature of purchase or transaction.

Alternatively or additionally, based on the risk level, the issuing entity may also determine whether to implement the default order of the CVM or whether to modify the order based on the card network.

At an operation 210, the issuing entity, based on the payment information, determines whether the device of the user has installed a mobile payment application or an application associated with the issuing entity. For this, the issuing entity detects that by comparing the device identifier from the payment information with a list of device identifiers obtained at the time of registration of devices or applications with the issuing entity. If the issuing entity detects a match, the issuing entity may lower or higher the risk associated with the payment transaction based on previously collected transactional data from the registered devices. Accordingly, the issuing entity can modify the CVM in accordance with the risk levels. However, if the issuing entity does not detect a connection between an existing device identifier and the device identifier of the payment information corresponding to the present transaction, the issuing entity may keep the CVM indicated by the card network.

In one implementation, the issuing entity, in response to an association between the application of the issuing entity and the payment transaction, reconfigures the order of the CVM based on a level of risk. For instance, the issuing entity may determine, from the merchant application stored on the device, whether the CVM should be modified based on which card network was determined.

At an operation 211, the issuing entity sends the applicable CVM to the POS device 104. As described before, the CVM is configured based on the risk level associated with the transaction. In one implementation, the risk level is inherently based on the association of the user device with the issuing entity. In another implementation, the CVM can be configured based on a determination that the location of the user's device is different from the location of the payment transaction or the payment instrument.

In an operation 212, the POS device 104, based on the CVM indicated by the issuing entity or the card processing network, requests verification information from the customer 106(1) according to the CVM. For instance, if the CVM indicates a specific order from the issuing entity such that the POS device is it to first request a PIN, then a signature, the CVM is executed. Or, if the CVM indicates a specific order from the issuing entity that the POS device 104 is to request a signature, then the POS device 104 requests a signature of the customer 106(1) (e.g., on a touchpad of the POS device 104). Optionally, if the issuing entity is unavailable to establish a connection between the issuing entity and the user or user's device, the POS device 104 can implement the CVM recommended by the card processing network. An operation 214 represents the customer 106(1) receiving the request for verification information.

FIG. 2B continues the illustration of the process 200. At an operation 215, the customer provides the requested verification information to the POS device 104, such as by entering her PIN, providing a signature, or the like. The requested verification information is configured according to the relationship between the customer or customer device and the issuing entity. An operation 216 represents the POS device 104 receiving the verification information. The verification information may also indicate a verification signature, where the verification signature indicates the verification method requested by the POS device 104. Also, the verification signature may indicate that the requested verification information was pushed by the issuing entity in response to an association between the issuing entity and the customer. Next, an operation 218 represents the POS device 104 determining whether or not the payment instrument has been authorized for the current transaction with the customer 106(1), based in part on the provided verification information. For instance, the POS device 104 may provide information regarding the payment instrument (e.g., identifier, expiration date, CVC code, etc.) along with the provided verification information (e.g., PIN, signature, etc.) to the payment service 108, which in turn attempts to authorize the payment instrument for the transaction.

If the POS device 104 receives an indication that the payment instrument has been authorized, then at 220 the merchant may provide the item to the customer in some instances. If the transaction fails, however, then an operation 222 represents the POS device 104 requesting verification information according to the CVM order until the transaction is authorized or until each piece of verification information has been requested without an authorization. For instance, if the transaction fails after the customer 106(1) provides a PIN, then the POS device may move to the second verification information listed on the CVM order, such as a signature, and may request a signature from the customer 106(1). Of course, in some instances the POS device may refrain from requesting additional verification information if a first piece fails (or if the transaction fails a threshold number of times). Further, the POS device 104 may request a certain piece of verification information multiple times (e.g., may request that the user again try to enter the correct PIN in the event that the first attempt fails).

Figure 3:
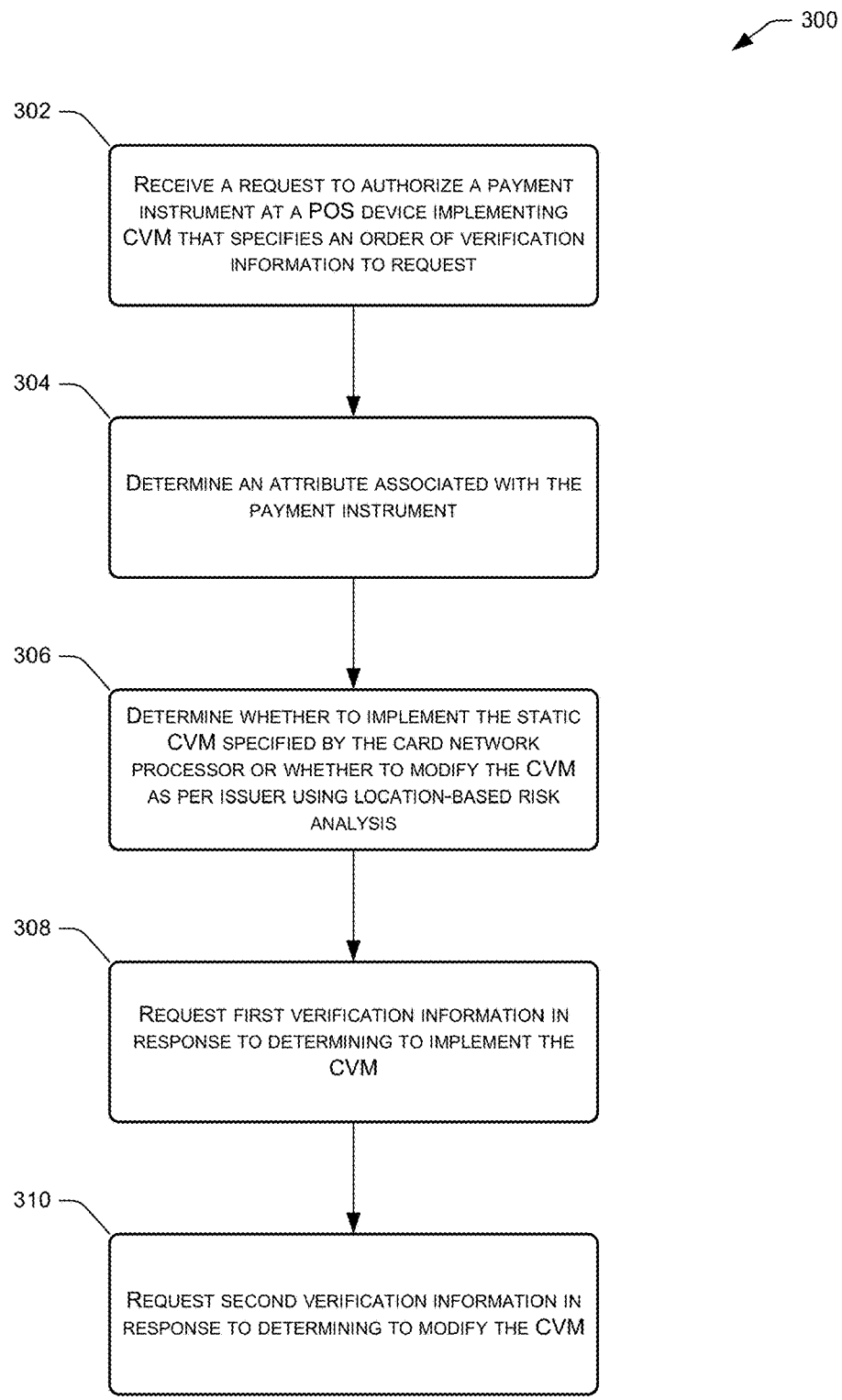
FIG. 3 illustrates a flow diagram of a process for determining whether to modify a CVM based on an attribute or identifier of a received payment instrument, and requesting first or second verification information depending upon whether or not the order has been modified.

FIG. 3 illustrates a flow diagram of a 300 process for determining whether to modify a CVM order based on an attribute of a received payment instrument, and requesting first or second verification information depending upon whether or not the order has been modified.

At 302, the process 300 receives a request to authorize a payment instrument at a POS device, the POS device implementing a CVM that specifies of order of verification information to request to a user associated with the payment instrument. At 304, the process 300 determines an attribute associated with the payment instrument. This attribute may include a card network of the payment instrument, a brand of the payment instrument, an issuing or acquiring bank of the payment instrument, and/or the like.

At 306, the process 300 may determine whether to implement the default CVM specified by the card processing network, or whether to modify the CVM, with this determination being based at least in part on the attribute of the payment instrument. In some instances, this determination is also based at least in part on a cost of the transaction, hardware or other capabilities of the POS device, and the like. For instance, if the POS device includes a touch screen to receive PINs rather than a dedicated hardware device for receiving these PINs, then the POS device may modify the order such that that a signature is listed first within the verification-information order. In another instance, the determination is based on the issuing entity confirming that the device is recognized by the issuing entity, as part of a previous registration. For example, the issuing entity may determine the risk level associated with the transaction based on whether or not the issuing entity recognizes the device. Accordingly, the issuing entity may modify the CVM to be more stringent than the one suggested by the card processing network. In some implementations, the process 300 includes combining the verification information as per the card processing network and the issuing entity in response to risk associated with the transaction and requesting the At 308, the process 300 requests first verification information in response to determining to implement the default CVM. That is, the POS device 104 may request the first listed piece of verification information, such as a PIN. At 310, meanwhile, the process 300 requests second, different verification information in response to determining to a new CVM or a new order of CVM. This second verification information may comprise a signature rather than a PIN in some instances.

FIG. 4 illustrates select example components of an example POS device 400 according to some implementations. The POS device 400 may be any suitable type of computing device, e.g., mobile, semi-mobile, semi-stationary, or stationary. Some examples of the POS device 400 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein. In one implementation, the POS device 400 can be a card reader or a server processing payments for the user.

In the illustrated example, the POS device 400 includes at least one processor 402, memory 404, a display 406, one or more input/output (I/O) components 408, one or more network interfaces 410, at least one card reader 412, at least one location component 414, and at least one power source 416. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable processor-executable instructions stored in the memory 404.

Depending on the configuration of the POS device 400, the memory 404 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 404 may include, but is not limited to, RAM, ROM, EEPROM, flash memory, solid-state storage, magnetic disk storage, optical storage, and/or other computer-readable media technology. Further, in some cases, the POS device 400 may access external storage, such as RAID storage systems, storage arrays, network attached storage, storage area networks, cloud storage, or any other medium that can be used to store information and that can be accessed by the processor 402 directly or through another computing device or network. Accordingly, the memory 404 may be computer storage media able to store instructions, modules or components that may be executed by the processor 402. Further, when mentioned, non-transitory computer-readable media exclude media such as energy, carrier signals, electromagnetic waves, and signals per se.

The memory 404 may be used to store and maintain any number of functional components that are executable by the processor 402. In some implementations, these functional components comprise instructions or programs that are executable by the processor 402 and that, when executed, implement operational logic for performing the actions and services attributed above to the POS device 400. Functional components of the POS device 400 stored in the memory 404 may include a merchant application 418, discussed above. The merchant application 418 may present an interface on the POS device 400 to enable the merchant to conduct transactions, receive payments, and so forth, as well as communicating with the payment service 102 for processing payments and sending transaction information. Further, the merchant application 418 may present an interface to enable the merchant to manage the merchant's account, and the like. The merchant application 418 may also include a module for dynamically modifying an order of a CVM based on attributes of a payment instrument, potentially based on additional factors, as described above with reference to FIGS. 1-3.

Additional functional components may include an operating system 420 for controlling and managing various functions of the POS device 400 and for enabling basic user interactions with the POS device 400. The memory 404 may also store transaction data 422 that is received based on the merchant associated with the POS device 400 engaging in various transactions with customers, such as the example customers 106 from FIG. 1.

In addition, the memory 404 may also store data, data structures and the like, that are used by the functional components. For example, this data may include item information that includes information about the items offered by the merchant, which may include images of the items, descriptions of the items, prices of the items, and so forth. Depending on the type of the POS device 400, the memory 404 may also optionally include other functional components and data, which may include programs, drivers, etc., and the data used or generated by the functional components. Further, the POS device 400 may include many other logical, programmatic and physical components, of which those described are merely examples that are related to the discussion herein.

The network interface(s) 410 may include one or more interfaces and hardware components for enabling communication with various other devices over the network or directly. For example, network interface(s) 410 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 4 further illustrates that the POS device 400 may include the display 406 mentioned above. Depending on the type of computing device used as the POS device 400, the display 406 may employ any suitable display technology. For example, the display 406 may be a liquid crystal display, a plasma display, a light emitting diode display, an OLED (organic light-emitting diode) display, an electronic paper display, or any other suitable type of display able to present digital content thereon. In some examples, the display 406 may have a touch sensor associated with the display 406 to provide a touchscreen display configured to receive touch inputs for enabling interaction with a graphic interface presented on the display 406. Accordingly, implementations herein are not limited to any particular display technology. Alternatively, in some examples, the POS device 400 may not include the display 406, and information may be present by other means, such as aurally.

The I/O components 408, meanwhile, may include speakers, a microphone, a camera, and various user controls (e.g., buttons, a joystick, a keyboard, a keypad, etc.), a haptic output device, and so forth.

In addition, the POS device 400 may include or may be connectable to a payment instrument reader 412. In some examples, the reader 412 may plug in to a port in the merchant device, such as a microphone/headphone port, a data port, or other suitable port. In other instances, the reader 412 is integral with the entire POS device 400. The reader may include a read head for reading a magnetic strip of a payment card, and further may include encryption technology for encrypting the information read from the magnetic strip. Alternatively, numerous other types of card readers may be employed with the POS devices 400 herein, depending on the type and configuration of a particular POS device 400.

The location component 414 may include a GPS device able to indicate location information, or the location component 414 may comprise another other location-based sensor. The POS device 400 may also include one or more additional sensors (not shown), such as an accelerometer, gyroscope, compass, proximity sensor, and the like. Additionally, the POS device 400 may include various other components that are not shown, examples of which include removable storage, a power control unit, and so forth.

In one implementation, the method implemented by device, such as device 400, includes a method for verifying a payment card at the time of a payment transaction between a merchant and a customer, the method includes receiving, at a point-of-sale (POS) device and from the user, the payment card for satisfying a cost of the payment transaction between the merchant and the customer; receiving, by the POS device, information from the payment card, including information related to a card network processor associated with the received payment card; detecting, by the POS device, a location of the POS device or one or more communication devices, wherein the location indicates a current location of the payment transaction; sending, to a processor of an issuing entity of the payment card and via a payment processing system, the information from the payment card; determining, by the processor of the issuing entity and based on the information from the payment card, if the user has installed an application on at least one registered communication device, the application configured for user management of the payment transaction using the payment card; obtaining, by the processor of the issuing entity, a device identifier corresponding to the registered communication device, wherein the device identifier is capable of indicating a location of the registered communication device on which the application is installed, and wherein the device identifier having been generated when the application is installed on the registered communication device; comparing, by the payment processing system, the location of the registered communication device as indicated by the device identifier with the location of the POS device or any of the communication devices at the current location of the payment transaction; if the location of the registered communication device as indicated by the device identifier is substantially similar to the location of the POS device or any of the communication devices at the current place of the payment transaction, configuring a cardholder verification method (CVM) for verifying the payment card received at the POS device irrespective of the CVM for the card network processor associated with the received payment card; and if the location of the registered communication device as indicated by the device identifier is substantially dissimilar to the location of the POS device or any of the communication devices at the current place of the payment transaction, presenting to the user the CVM specified by the card network processor associated with the received payment card. The payment processing system further determines a level of risk associated with the payment transaction based at least on the location of the registered device being substantially dissimilar to the location of the POS device or any of the communication devices. The configuration is further based at least in part on at least one of hardware associated with the POS device or a capability of the POS device, and wherein the hardware includes a touch screen to receive signature of the user or a dedicated hardware device for receiving personal identification numbers (PINs).

In another implementation, the method includes receiving, by an entity issuing a payment instrument, a request to authorize the payment instrument at a point-of-sale (POS) device, the entity issuing the payment instrument programmed to selectively implement a dynamic cardholder verification method (CVM) at the POS device, wherein the dynamic CVM is configured based on an identifier associated with the payment transaction; receiving, the identifier associated with the payment transaction, the identifier including information corresponding to the payment instrument and/or one or more communication devices in proximity to the payment instrument; determining, by an entity issuing the payment instrument and based on the identifier, whether at least one of the communication devices is registered with the entity issuing the payment instrument; determining, by the entity issuing the payment instrument, whether to implement a static CVM specified by a card network associated with the payment instrument or whether to apply the dynamic CVM, wherein the dynamic CVM is generated and applied if the communication device is registered with the entity issuing the payment instrument; and requesting, on the POS device, an input in response to the dynamic CVM generated by the entity issuing the payment instrument. The identifier comprises a location of the communication device with respect to a location of the payment instrument or the POS device.

The identifier also comprises whether the payment instrument includes a magnetic strip storing payment information associated with the payment instrument or a chip storing the payment information associated with the payment instrument. The dynamic CVM comprises a specific order of a personal identification number (PIN) or a signature of the user associated with the payment instrument followed by another PIN or a signature.

The determination of whether to implement or modify the static CVM specified by the card network is further based at least in part on a capability of the POS device or the communication device. The method further includes submitting the dynamic CVM and an identifier associated with the payment instrument to a remote entity for authorizing the payment instrument; an indication that the payment instrument has not been authorized; and requesting the static CVM from a user associated with the payment instrument after receiving the indication.

In another implementation, a payment device is disclosed. The payment device includes one or more processors; and one or more computer-readable media storing computer-executable instructions that, when executed by the one or more processors, cause the one or more processors to: obtain an attribute associated with the payment instrument received by the payment device, wherein the payment instrument is used towards satisfying a cost of a payment transaction; obtain information corresponding to at least one communication device in proximity to the payment device or the payment instrument; detect, based on the information of the communication device and the attribute of the payment device, whether there is a pre-existing relationship between the communication device and the payment instrument;

on detecting the pre-existing relationship between the communication device and the payment instrument, generate a verification order different from a default verification order set by a card network processor, where the verification order is presented to a customer of the payment instrument to authorize the payment transaction; and request an input from the customer of the payment instrument according to the generated verification order. The pre-existing relationship is established at a time of registration of the payment instrument or the communication device with the payment device issuing the payment instrument.

The device further includes a rule engine to determine a risk level associated with the payment transaction, based in part on the pre-existing relationship between the communication device and the payment instrument. The rule engine is configured to: query a device registered with the payment instrument; compare the location of the registered device with the communication device in proximity to the payment instrument or the payment device; and determine that the relationship is pre-existing based at least on the comparison.

The attribute comprises whether the payment instrument includes a magnetic strip that stores payment information or a chip that stores the payment information. Further, the default verification order is a generic value set by the card network processor for the payment instrument issued by an entity issuing the payment instrument. The determining of the CVM is based at least in part on one or more of: (a) specifications of the apparatus; (b) the cost of the payment transaction; (c) a type of the payment instrument; and (d) a brand of the payment instrument. The payment device includes a touch-sensitive display to display information regarding the payment transaction and to receive from the customer associated with the payment instrument an input corresponding to the generated CVM.

In one implementation, the method implemented at least in part by a processor associated with an entity issuing at least one payment instrument, the method comprising: receiving a request to authenticate use of the payment instrument at a point-of-sale (POS) device in response to a payment transaction; obtaining, from a database, an attribute associated with the payment instrument, wherein the attribute indicates a predicted location of a communication device associated with a holder of the payment instrument at a time of the payment transaction, wherein the attribute is set in response to an execution or registration of an application of the entity issuing the payment instrument on a communication device; obtaining, through a location sensor of the POS device, a current location of the payment transaction; determining whether the current location of the payment transaction involving the payment instrument substantially matches the predicted location of the communication device associated with the holder of the payment instrument; and implementing, via the processor, a cardholder verification method (CVM) that specifies a device-specific order of verification information to request for verifying the payment instrument if the current location of the communication device matches the predicted location.

The method includes determining a level of risk associated with the transaction based at least in part on a mapping of the predicted location with the current location; and configuring the device-specific order of verification information in accordance with the level of risk. The method includes predicting the location of the communication device by using the attribute to query the communication device. The method also includes determining whether to implement a generic order of the CVM specified by a card processing network or modify the generic order of the CVM to a device-specific order of the CVM based at least in part on one or more of: (a) a cost of the payment transaction for which the payment instrument is being authorized; (b) a hardware capability of the POS device; (c) the location of the payment transaction; and (d) the entity issuing the payment instrument.

Figure 5A:
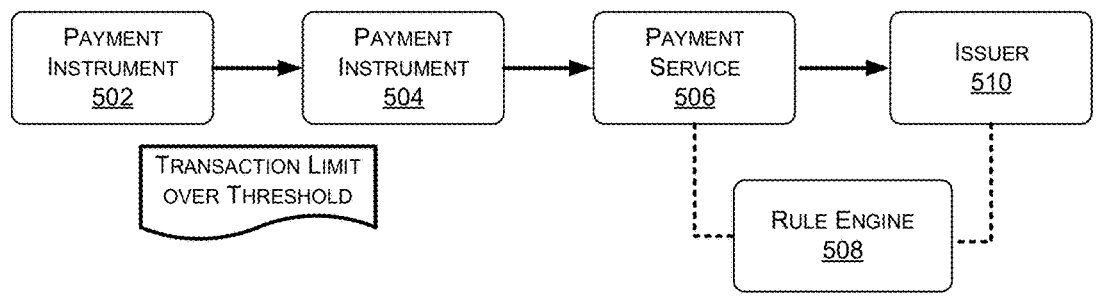
FIGS. 5A, 5B, and 5C illustrates select components of a POS device that a merchant described herein may utilize.
Figure 5B:
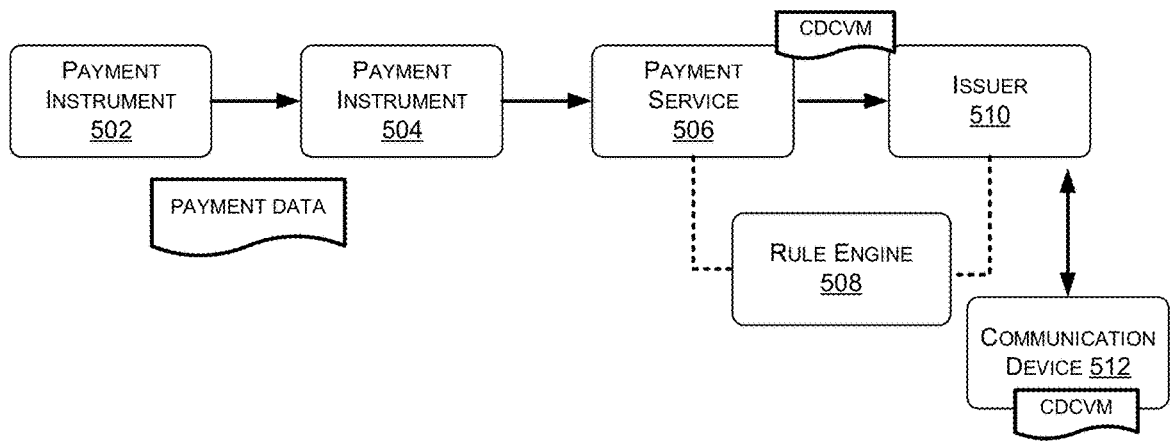
Figure 5C:
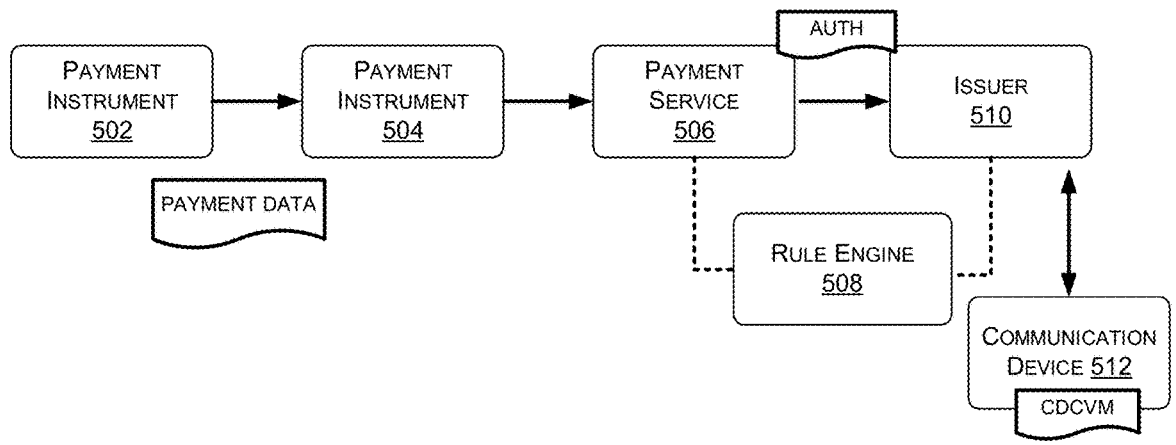

FIGS. 5A-C further illustrate exemplary use cases associated with the method and systems described above. For example, in a first exemplary scenario 5A, the user presents the payment card 502 at the payment terminal 504 for a transaction amount over a transaction limit pre-set by the issuer or card network processor. Traditionally, the terminal declines the transaction and no further communication is supplied to the payment processor 506 or issuer 510. In the embodiments described herein, the payment terminal 504 sends information pertaining to the payment card 502 and/or the transaction, including size of the ticket, to the issuer 510. The issuer 510 then, based on risk analysis of the ticket size with respect to the specific user, may prompt a secondary authentication or decline the charge and prompt another form of payment. The issuer 510 performs the risk analysis based on one or more rules stored in the rule engine 508 associated with the payment service 502 or the issuer 510.

In a second example scenario 5B, the new CVM may be authenticated before the normal payment flow. The user presents the payment card 502 at the payment terminal 504. The payment terminal 504 sends the request for CVM to the issuer 510 via the payment processing system, or payment service, 506. The issuer 510 then compares the payment card identifier embedded in the request with an internal database. If the payment card is identified, the issuer sends a request on the communication device of the user 512 for either a response or an actual CVM, such as a text message or fingerprint response. The communication device of the user 512 does not necessarily need to be at the location of the payment transaction, however. As such, the user need not respond to the CVM requested by the issuer contemporaneous to the payment transaction. In such cases, the issuer can provisionally authenticate the payment transaction and finalize the transaction after the user has provided the CVM at a later time. The issuer may assign a specific time window within which the issuer allows the user to provide an input to the CVM. The CVM is then submitted directly to the issuer 510 as consumer device cardholder verification method (CDCVM). The issuer 510 sends the collected CVM to the payment processing system 506. The payment transaction is then authorized and the item is released to the customer.

In a third example scenario 5C, the user presents the payment card 502 at the payment terminal 504. The payment terminal 504 sends the request for CVM to the issuer 510 via the payment processing system, or the payment service, 506. In one implementation, the issuer identifies the user's communication device (either by identifying the device identifier, a mobile payment application, phone number of the user using a certain payment card, or other such identifier). The issuer determines the validity of the CVM and confirms that the collected CVM is adequate for authentication and therefore for chargeback and liability purposes. In this manner, the authentication is accepted as part of the messaging or other way to detect communication device.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method for verifying a physical payment card during a payment transaction between a merchant and a customer, the method comprising:
    storing, in a database associated with an issuer, an association between (1) a device identifier of a communication device associated with a user, and (2) a card identifier of the physical payment card associated with the user, wherein the physical payment card is physically distinct from the communication device, and wherein a type of the physical payment card is at least one of a chip-enabled card, a magnetic strip card, a NFC-enabled card, or a RFID-enabled card;
    receiving, by one or more server computing devices of the issuer from a point-of-sale (POS) device and via a card network, a request to authorize use of the physical payment card at the POS device in the payment transaction, the request to authorize indicating the card network associated with the physical payment card and the card identifier, wherein the request to authorize is generated responsive at least in part to interaction between the POS device and the physical payment card;
    determining, by the one or more server computing devices, utilizing the card identifier in the database, that an application has been installed on the communication device, the application associated with the issuer and configured for management of the use of the physical payment card in the payment transaction;
    determining, by the one or more server computing devices, based at least in part on the application being installed on the communication device and the type of the physical payment card, a cardholder verification method (CVM) for verifying the physical payment card, wherein the CVM differs from a default CVM for the card network associated with the physical payment card; and
    based at least in part on determining the CVM, sending, by the one or more server computing devices and to the POS device, a request for input according to the CVM.

2. The method of claim 1, further comprising:
    determining a level of risk associated with the payment transaction based at least on a first location of the communication device and a second location of the POS device; and
    determining that the level of risk satisfies a threshold level of risk,
    wherein determining that the application has been installed is responsive at least in part to determining that the level of risk satisfies the threshold level of risk.

3. The method of claim 1, wherein determining the CVM comprises determining the CVM based at least in part on hardware associated with the POS device, wherein the hardware includes a touch screen configured to receive a signature or a dedicated hardware device for receiving personal identification numbers (PINs).

4. The method of claim 1, further comprising:
    receiving a first location of one or more communication devices in proximity to the POS device; and determining that the communication device is one of the one or more communication devices, wherein determining the CVM comprises determining the CVM based at least in part on the communication device being one of the one or more communication devices.

5. The method of claim 1, further comprising:
determining, based at least in part on the card identifier, that the type of the physical payment card.

6. The method of claim 1, wherein:
the default CVM comprises a static CVM specified by the card network associated with the physical payment card, and
the CVM comprises a dynamic CVM that alters at least one operation associated with the static CVM.

7. The method of claim 1, wherein determining the CVM includes implementing a dynamic CVM, and the method further comprises:
generating the request for input in response to the dynamic CVM.

8. The method of claim 7, wherein the dynamic CVM comprises a specific order of obtaining a personal identification number (PIN) and a signature of the user.

9. The method of claim 1, wherein determining the CVM comprises determining the CVM based at least in part on a capability of at least one of the POS device or the communication device.

10. A system comprising:
a communication device associated with a user;
a physical payment card;
one or more server computing devices of an issuer;
one or more processors; and
one or more computer-readable media storing computer-executable instructions that, when executed by the one or more processors, cause the one or more processors to perform operations comprising:
storing, in a database associated with the issuer, an association between (1) a device identifier of the communication device associated with the user, and (2) a card identifier of the physical payment card associated with the user, wherein the physical payment card is physically distinct from the communication device, and wherein a type of the physical payment card is at least one of a chip-enabled card, a magnetic strip card, a NFC-enabled card, or a RFID-enabled card;
receiving, by the one or more server computing devices, first data comprising a request to authorize the physical payment card at a point-of-sale (POS) device for a payment transaction occurring in association with the physical payment card, the first data identifying the physical payment card and a transaction location of the payment transaction, wherein the first data is generated responsive at least in part to interaction between the POS device and the physical payment card;
determining, by the one or more server computing devices, utilizing the card identifier stored in the database, that the communication device is associated with the physical payment card;
sending, by the one or more server computing devices, a request for a device location of the communication device to an application that is installed on the communication device, the application being associated with the system;
receiving, by the one or more server computing devices, the device location from the application;
generating, by the one or more server computing devices, a cardholder verification method (CVM) based at least in part on the type of the physical payment card and the device location being substantially similar to the transaction location, the CVM differing from a default CVM associated with the physical payment card; and
sending, by the one or more server computing devices to the POS device and based at least in part on the CVM, a request for input associated with the payment transaction.

11. The system of claim 10, wherein the first data indicates that the communication device is within a threshold distance of the POS device, and generating the CVM comprises generating the CVM based at least in part on the communication device being within the threshold distance of the POS device.

12. The system of claim 10, the operations further comprising:
determining, based at least in part on the card identifier, the type of the physical payment card.

13. The system of claim 10, wherein the CVM comprises an order of obtaining a personal identification number (PIN) and a signature of the user.

14. The system of claim 10, the operations further comprising:
determining a capability of at least one of the POS device or the communication device,
wherein the CVM is based at least in part on the capability.

15. The system of claim 10, wherein the CVM comprises a first CVM, and the operations further comprise:
receiving second data representing a response to the first CVM;
determining, based on the response to the first CVM, that the physical payment card has not been authorized; and
sending, to the POS device, a second CVM to be performed based at least in part on the physical payment card not being authorized.

16. A method comprising:
storing, in a database associated with an issuer, an association between (1) a device identifier of a communication device associated with a user, and (2) a card identifier of a physical payment card associated with the user, wherein the physical payment card is physically distinct from the communication device, and wherein a type of the physical payment card is at least one of a chip-enabled card, a magnetic strip card, a NFC-enabled card, or a RFID-enabled card;
receiving, by one or more server computing devices of the issuer and via a card network, a request to authorize the physical payment card at a point-of-sale (POS) device in association with a payment transaction, the request to authorize indicating the card identifier stored in the database, wherein the request to authorize is responsive at least in part to interaction between the POS device and the physical payment card;
determining, by the one or more server computing devices and based at least in part on the card identifier stored in the database, that an application has been installed on the communication device, the application configured for management of use of the physical payment card in the payment transaction;
determining, by the one or more server computing devices, a capability of the communication device;
generating, by the one or more server computing devices and based at least in part on the application being installed on the communication device, the capability of the communication device, and the type of the physical payment card, a cardholder verification method (CVM) for verifying the physical payment card, wherein the CVM differs from a default CVM associated with the physical payment card; and based at least in part on determining the CVM, sending, by the one or more server computing devices and to the POS device, a request for input according to the CVM.

17. The method of claim 16, further comprising:
determining the capability of the POS device.

18. The method of claim 16, wherein the CVM specifies an order of verification information to request for verifying the physical payment card.

19. The method of claim 16, wherein the CVM is based at least in part on at least one of:
a cost of the payment transaction;
a hardware capability of the POS device; or
a location of the payment transaction.

20. The method of claim 16, wherein the CVM is based at least in part on a configuration of the physical payment card.

* * * * *